United States Patent
Pounder et al.

[15] 3,685,352
[45] Aug. 22, 1972

[54] COURSE-MADE-GOOD APPARATUS FOR SAILBOATS

[72] Inventors: Edwin Pounder, Sierra Madre; John R. Casani, Altadena, both of Calif.

[73] Assignee: Transdynamics, Inc., Burbank, Calif.

[22] Filed: Dec. 2, 1970

[21] Appl. No.: 94,278

[52] U.S. Cl. ................................. 73/178 R, 73/181
[51] Int. Cl. ........................ G01c 21/10, G01c 23/00
[58] Field of Search........73/181, 189, 182, 183, 184, 73/185, 186, 187, 178; 33/204.4

[56] References Cited

UNITED STATES PATENTS 3,141,725   7/1964   Gray ....................... 73/178 X

*Primary Examiner*—Donald O. Woodiel
*Attorney*—Christie, Parker & Hale

[57] ABSTRACT

A sailboat measures and displays course-made-good information with the use of a gimbal-mounted magnetometer sensor for detecting the direction of the earth's magnetic field. The magnetically sensitive axis of the sensor is aligned with the earth's magnetic field when the boat is headed on a desired course, and the sensor is then locked in a fixed position relative to the boat, with the magnetometer thereafter producing a voltage which is proportional to the cosine of the angular deviation of the boat from the desired course. A voltage signal representing boat speed is coupled with the voltage from the magnetometer in a multiplier to produce a voltage proportional to the vector component of the boat speed in the direction of the desired course. The voltage from the magnetometer sensor is fed to a meter to display the angular deviation of the boat from the desired course, and the voltage from the multiplier is fed to a meter to display the boat's velocity vector component in the direction of the desired course.

15 Claims, 7 Drawing Figures

INVENTORS
JOHN R. CASANI
EDWIN POUNDER
BY
Christie, Parker + Hale
ATTORNEYS

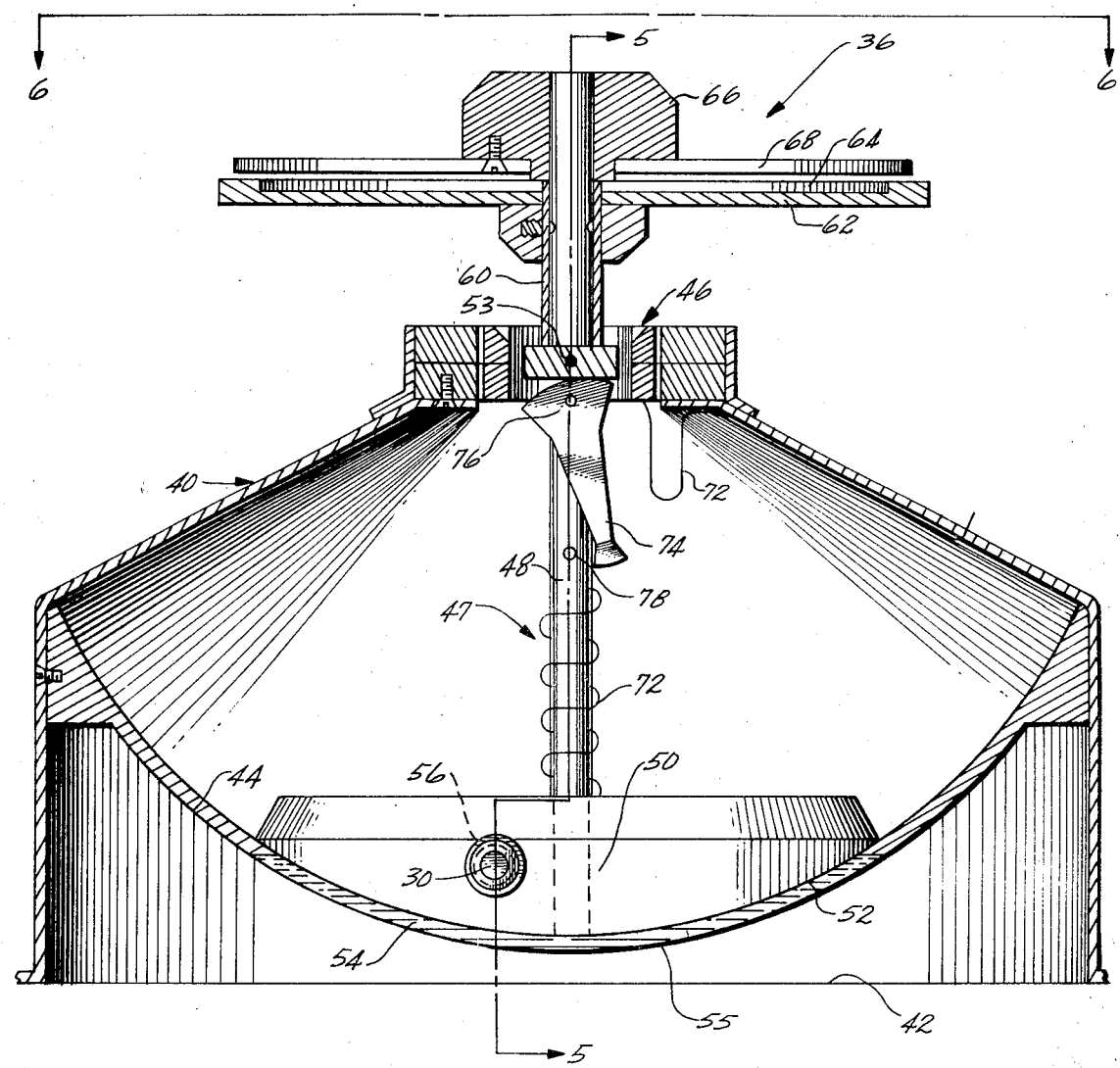
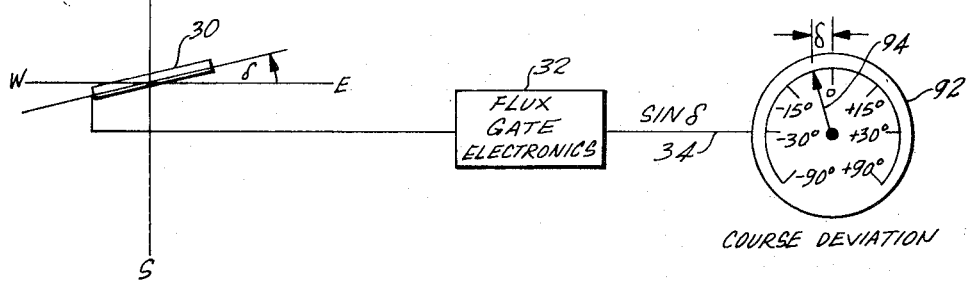

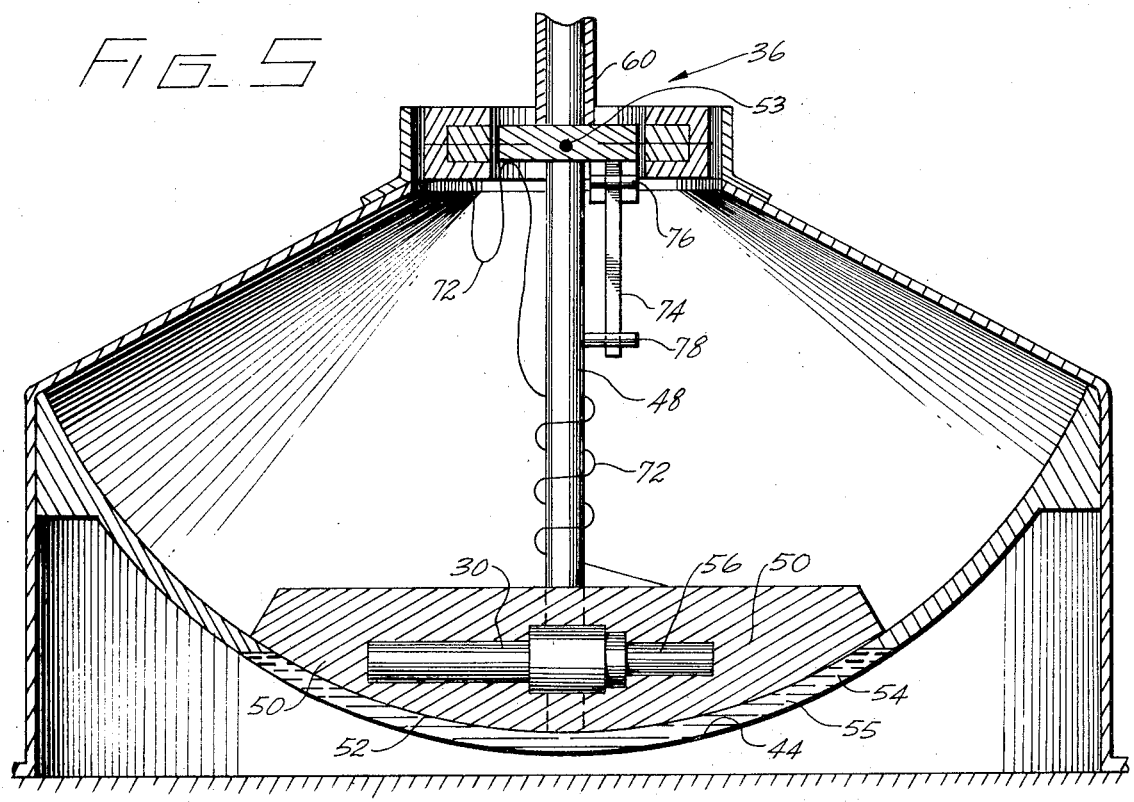
Fig_5
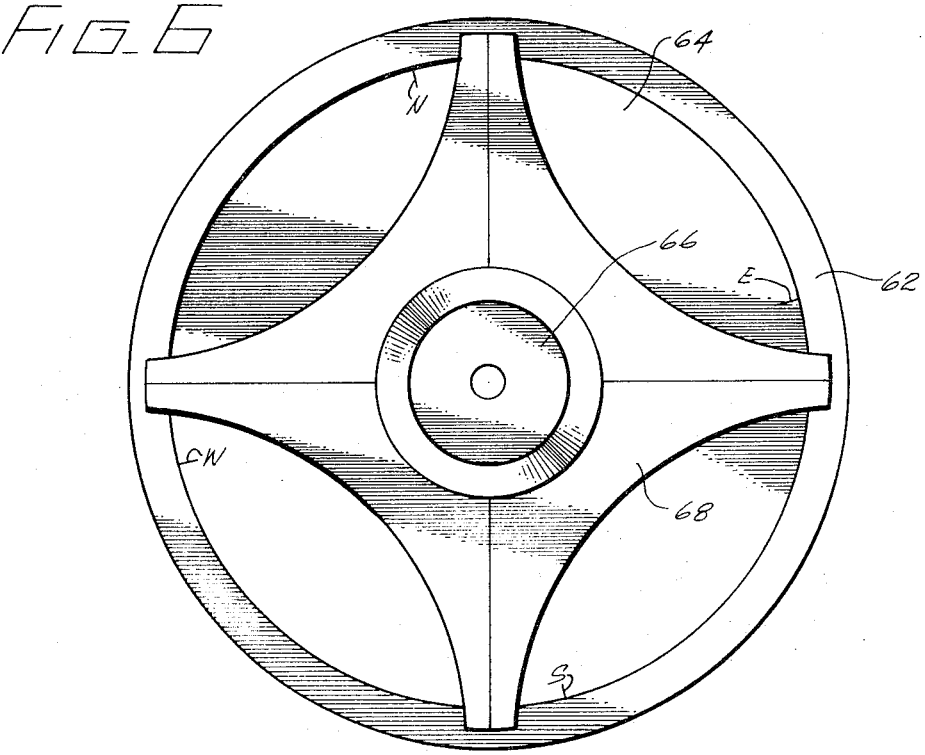
Fig_6

COURSE-MADE-GOOD APPARATUS FOR SAILBOATS

BACKGROUND OF THE INVENTION

This invention relates to apparatus for navigating sailboats, and more particularly to a system that measures and displays "course-made-good" information, such as course-made-good speed and course-made-good heading. Course-made-good speed is defined generally as the vector component of boat velocity in the direction of a desired course, with course-made-good heading being the angular deviation of the boat from the desired course.

When a mark to be reached is upwind from a sailboat, the boat is sailed on two or more courses at angles to the true wind, or "tacks," to reach the mark. When a mark to be reached is downwind from the sailboat, the boat can be sailed with the wind to reach the mark. However, in most cases the downwind mark can be reached in shorter time if the boat is sailed on two or more tacks with the wind, because the sails provide increased airfoil action when the boat sails at an angle to the wind.

In each of these cases, the boat reaches its mark in minimum time if a particular course is chosen so that the vector component of the boat's velocity parallel to the true wind is as large as possible.

When a mark to be reached is at a large angle relative to the true wind, the boat is generally sailed in the direction of the mark. However, in some cases the mark can be reached in minimum time if the boat is sailed on two or more courses relative to the mark. This occurs if the particular course is chosen so that the vector component of the boat's velocity toward the mark is a maximum.

Generally speaking, sailboats have not been equipped with a device to measure and display course-made-good information such as the boat's velocity vector component in the direction of a desired course, and the angular deviation of the boat from the desired course. Such a device appears to be expensive and complex to mechanize completely, particularly because the true wind speed and its direction cannot be observed from the moving boat.

SUMMARY OF THE INVENTION

This invention provides course-made-good apparatus to measure and display the heading of a sailboat relative to a desired direction and the vector component of the boat's velocity in the desired direction. The invention overcomes the problems of the prior art by providing a device which can be set to "remember" the true wind direction from a point in time when it can be observed directly.

Briefly, one embodiment of the course-made-good apparatus comprises a steering compass for measuring the angle between a reference line on a sailboat and a desired direction. The steering compass includes a movable magnetometer sensor for detecting the direction of a magnetic reference point from a point on the boat. The position of the sensor is adjusted and set at a fixed angular reference position defining an initial angle between the magnetic reference point and the reference line on the boat. A magnetometer circuit responsive to the setting of the initial angle produces a signal representative of the angular deviation of the sensor from the reference position. The signal is monitored to give a continuous reading of the boat's angular position relative to the desired direction.

Another embodiment of the course-made-good apparatus detects the sailboat heading that produces the maximum component of boat velocity in the desired direction. The apparatus includes a sensing device for measuring the angle between a reference line on the boat and a desired direction. Alignment means mounted on the boat cooperate with the sensing device to produce a reference measurement of the angle between the desired direction and the reference point. Means responsive to the measurement produced by the sensing device and the reference measurement produces a heading signal representative of the angular deviation of the reference line on the boat from the desired direction. A speed signal representing the actual speed of the boat is coupled with the position signal to means for producing a velocity vector signal representative of course-made-good speed, i.e., the vector component of the boat velocity in the desired direction.

Preferably, the position signal is fed to a meter to monitor angular deviations of the boat from its desired direction, and the velocity vector signal is fed to a meter to monitor course-made-good speed.

In a preferred form of the invention, the sensing device comprises a gimbal-mounted magnetometer sensor having a magnetically sensitive axis for detecting the direction of the earth's magnetic field, and alignment means for locking the sensor in a fixed angular reference position relative to the reference line on the boat. A magnetometer circuit is coupled to the sensor for producing a voltage signal proportional to the cosine of the angle between the magnetically sensitive axis of the sensor and the direction of the earth's magnetic field.

Thus, when the boat is headed in the direction of a mark on a desired course, the sensor is aligned with the earth's magnetic field and locked in position to establish the reference position of the boat. Thereafter, as the boat is sailed on a tack relative to the desired course, the magnetometer circuit produces a voltage proportional to the cosine of the boat's angular deviation from the direction of the desired course. A voltage signal having a magnitude proportional to boat speed is coupled with the magnetometer voltage in a multiplier to produce a voltage proportional to the magnitude of the component of the boat's velocity vector in the desired direction. Thus, as the boat is sailed to reach the mark, velocity vector information is monitored as the boat is steered to determine the particular course that produces a maximum velocity vector relative to the direction of the desired course. If the boat is then sailed on that particular course, it reaches the mark in the shortest time.

BRIEF DESCRIPTION OF THE DRAWINGS

The above and other features of the invention are more fully set forth in the following detailed description of the embodiment of the invention which is presently preferred, such description being presented with reference to the accompanying drawings, wherein:

FIG. 4 is an elevation view of a gimbal system for mounting the magnetometer sensor;

FIG. 5 is an elevation view taken on line 5—5 of FIG. 4;

FIG. 6 is a plan elevation view taken on line 6—6 of FIG. 4; and

FIG. 7 is a schematic block diagram showing the steering compass of this invention.

DETAILED DESCRIPTION OF THE PREFERRED EMBODIMENT

Figure 1:
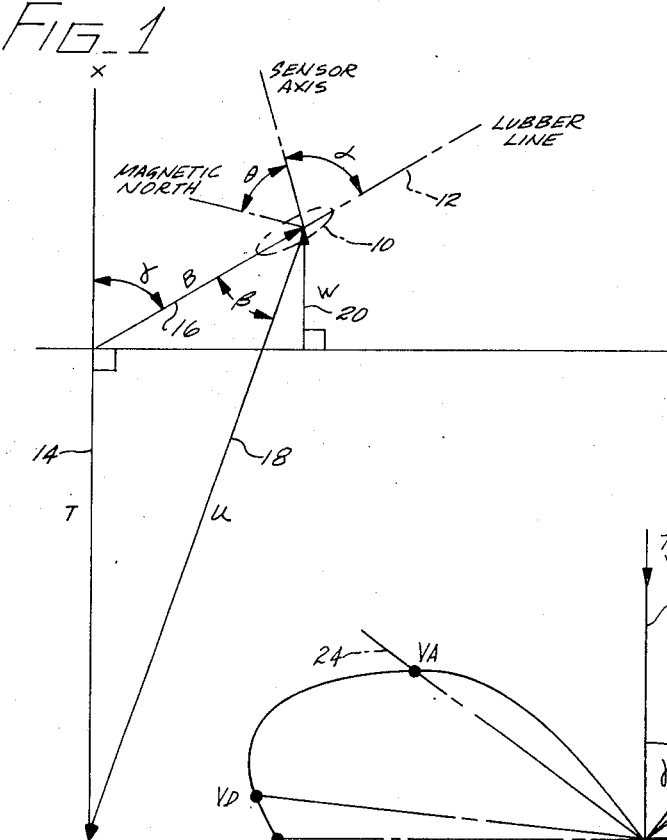
FIG. 1 is a schematic diagram defining course-made-good speed of a sailboat sailing on a tack into the wind.

Referring to FIG. 1, a sailboat 10 is sailed on a tack or course represented by a line 12 which heads in the direction of the boat's lubber line (longitudinal centerline). The tack is shown heading into the wind. The true wind is represented by the vector 14 having a magnitude T, the tack being at an angle $\gamma$ (hereafter referred to as the heading angle or course-made-good heading) relative to the direction of the true wind. The boat sails for a mark X in the direction of the true wind. However, since the boat cannot sail directly into the wind, it sails along the tack 12 with a speed represented by a vector 16 having a magnitude B. The apparent wind velocity observed from the boat is represented by a vector 18 having a magnitude U acting in a direction represented by the angle $\beta$ relative to the boat.

The vector component of the boat velocity directly into the wind is represented by a vector 20 having a magnitude W which equals the quantity $B \cos \gamma$. As described above, the boat reaches a mark upwind in the shortest time when the boat sails on a tack on which the magnitude of the vector velocity W, i.e., course-made-good speed, is a maximum.

Figure 2:
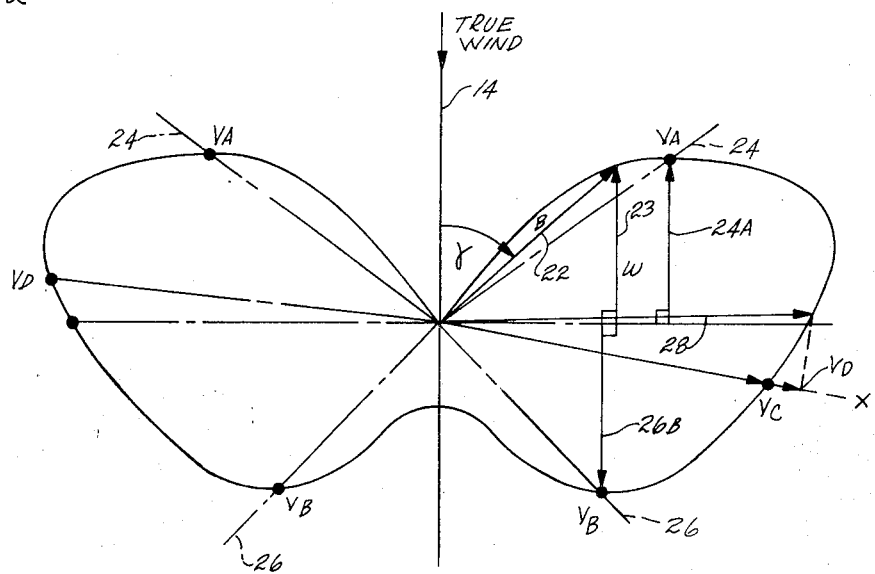
FIG. 2 is a schematic diagram showing a velocity characteristic of a typical sailboat.

FIG. 2 represents a velocity characteristic for a typical sailboat showing the maximum velocity which the boat can achieve through the water when sailing on a given course relative to the true wind. For example, when the boat in FIG. 2 sails on a tack into the wind at an angle $\gamma$ relative to the true wind, the boat achieves a maximum velocity B represented by the vector 22. The vector 23 represents the component W of the boat's velocity vector in the direction of the true wind, i.e., the boat's course-made-good speed.

When the boat in FIG. 2 sails on a tack into the wind, course-made-good speed (relative to the direction of the true wind) is a maximum when the boat is headed on the tack 24 that produces a course-made-good speed represented by the vector 24A having a magnitude $V_A$. Similarly, when the boat sails on a tack with the wind, the vector component of the boat's velocity relative to the direction of the true wind is a maximum when the boat is headed on the tack 26 that produces a course-made-good speed represented by the vector 26B having a magnitude $V_B$. If the boat sails downwind without tacking, FIG. 2 shows that the boat's course-made-good speed is less than $V_B$.

If a mark X to be reached is at a large angle relative to the true wind, as shown in FIG. 2, the boat can achieve a velocity $V_C$ in the direction of the mark. However, the velocity characteristic of FIG. 2 shows that if the boat sails on a tack 28, it reaches a course-made-good speed $V_D$ toward the mark which can be larger than velocity $V_C$.

The course-made-good speed characteristic is generally different for each boat, and the characteristic is dependent generally upon the shape of the hull and the type of rigging used on the boat. Furthermore, the characteristic for the same boat changes with time depending upon such factors as changes in rigging, sea conditions, and the degree of hull fouling.

This invention is based on the recognition that a device to measure and display course-made-good information permits a skipper to select the particular tack that produces a maximum velocity component in the direction of a desired course. Course-made-good information is generally not available because the true wind speed and its direction cannot be observed from the moving boat. When the boat is moving, the boat's apparent wind speed, U, and the direction of the apparent wind, $\beta$, are observed.

Figure 3:
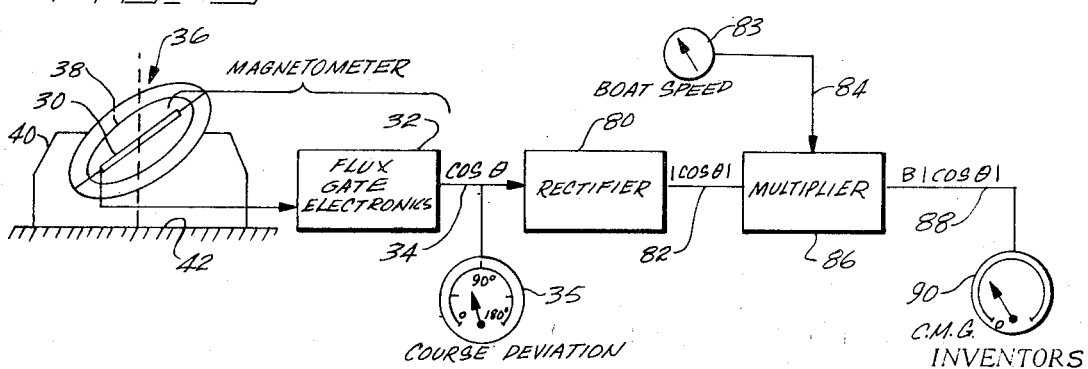
FIG. 3 is a schematic block diagram showing the course-made-good apparatus of this invention.

FIG. 3 shows a system that automatically measures and displays the heading angle, $\gamma$, and course-made-good speed, W, of a sailboat. The system includes a flux gate magnetometer having a manually adjustable sensor 30 in the form of an elongated cylindrical rod with a longitudinal axis that senses the direction of the earth's magnetic field. A winding (not shown) disposed about an intermediate portion of the sensor 30 is connected to a conventional flux gate magnetometer circuit, or "flux gate electronics," represented generally by the block 32.

The operation of the magnetometer is well known. The magnetometer circuit 32 causes an alternating current to flow in the magnetometer winding to thereby produce in the sensor 30 an alternating flux of the same frequency. When the sensor is placed in a magnetic field, the field produces a magnetic flux in the sensor that changes the magnitude of the alternating current through its winding. The change in current is amplified and converted to a voltage signal 34 that gives a direct measurement of the component of the magnetic field falling in the direction of the axis of the sensor. Thus, the voltage signal 34 has a magnitude equal to a constant voltage times the cosine of the angle $\theta$ (see FIG. 1), which is the angle between the sensitive axis of the sensor 30 and the direction of the earth's magnetic field. Thus, voltage signal 34 has a maximum magnitude when the sensor is aligned with the earth's magnetic field (magnetic north), and the voltage falls off as the sensor turns away from the magnetic field. When the sensor is at a right angle relative to the earth's magnetic field, e.g., magnetic east, the voltage is zero.

Voltage signal 34 is fed to a heading meter or course deviation indicator 35 having a scale that displays the voltage signal 34 as a reading of the angle $\theta$ between the magnetically sensitive axis of the sensor 30 and the direction of the earth's magnetic field. Thus, when the sensor is aligned with the earth's magnetic field, the magnitude of the voltage 34 is a maximum, and the scale on the heading meter 35 reads 0°. When the sensor is aligned with the earth's magnetic field but turned 180° away from the magnetic north, the voltage 34 is also a maximum, but of opposite phase, so that the meter 35 reads 180°. When the sensor is turned at a right angle from the earth's magnetic field, the magnitude of the voltage 34 is zero, and the meter 35 reads 90°.

A power cable (not shown) connects the heading meter 35 to a 12 volt D.C. power supply. A separate cable (not shown) connects the heading indicator to the magnetometer circuitry 32.

A gimbal system 36 mounted in a fixed position on the boat has an inner gimbal ring 38 that mounts the sensor 30 to stabilize the motion of the sensor in the horizontal plane. Thus, the sensor remains in a horizontal position independently of the pitching or rolling motion of the boat induced by wave action and the like.

The construction and operation of the gimbal system 36 is best understood by referring to FIGS. 4 through 6 which show a gimbal casing 40 mounted in a fixed position to boat 42. The interior lower portion of the casing has an upwardly opening spherically curved surface 44 in the form of a cup. Gimbal rings 46 are mounted at the top of the casing 40 above surface 44. The inner gimbal ring 38 mounts a pendulum 47 formed by an upright elongated pendulous shaft 48 that supports at its bottom a weight 50 having a spherically curved lower surface 52 which is closely spaced from spherical surface 44. In use, the gimbals permit the pendulum to pivot about the transverse axes at 53 so that the shaft 48 constantly maintains a fixed vertical orientation as the casing moves with the boat due to wave action. A puddle of damping oil 54 in the gap 55 between the bottom of the weight 50 and upper surface 44 provides damping for the motion of the pendulum. The damping force provided by the oil is related to the viscosity of the oil, the mass of the pendulum, and the width of gap 55.

The magnetometer sensor 30, which comprises a cylindrical rod, is carried within an outwardly opening bore 56 formed in the pendulum weight 50. The entire device is made of a nonmagnetic material.

An elongated sleeve 60 fitted over an upper portion of the pendulum shaft above the gimbals carries a circular support plate 62. The sleeve maintains the support plate in a fixed position aligned with the lubber line of the boat while the pendulum shaft is free to rotate relative to the sleeve. The support plate carries a compass rose card 64. A knob 66 fastened to the top of pendulum shaft 48 carries a pointer 68. In use, the knob is turned to rotate the pendulum shaft so as to align the magnetometer sensor 30 with the earth's magnetic field. The pointer turns with the shaft to indicate the position of the magnetometer sensor relative to the lubber line of the boat. When the sensor is properly aligned, the pendulum shaft is locked in a fixed position relative to the lubber line by a friction device such as a clutch (not shown).

The windings on the magnetometer sensor 30 are coupled to an output lead wire 72 which leads from the bore 56 in weight 50 upwardly to be wound on the pendulum shaft. The lead wire is then secured to the bottom of the gimbal platform, and extended outside the casing for connection to the module (not shown) that houses the flux gate circuitry shown at 32 in FIG. 3. An elongated downwardly extending arm 74 is secured to the bottom of the gimbal platform by a pivot pin 76. A stop pin 78 is fastened to the pendulum shaft adjacent to the lower portion of the arm, and as the pendulum shaft rotates relative to the arm 74 the stop pin 78 abuts against either side of the arm 74, depending upon the direction of rotation, to limit further rotation of the pendulum shaft relative to the casing. Rotation of the pendulum shaft is limited to prevent the lead wire 72 from breaking in the event it is twisted too tightly on the pendulum shaft. The arm 74 pivots about pin 76 through an arc of about 20° in either direction after contacting the stop pin, so that the shaft can be rotated through about 400° relative to the casing to provide a slight overlap in either direction of rotation.

In use, the magnetometer sensor 30 references the direction of a desired course. When the boat is initially headed in the desired direction, the magnetometer sensor is immediately aligned with the earth's magnetic field by turning the knob 66 until the meter 35 reads 0°, indicating that the voltage signal 34 from the magnetometer is a maximum. The above-described friction device is then applied to prevent relative movement between the sensor axis and the lubber line of the boat. Thereafter, the sensor remains stable in the horizontal plane and aligned at a fixed angle $\alpha$ (see FIG. 1) relative to the lubber line of the boat. Thus, as the boat is steered at an angle $\gamma$ away from the desired course, the angle $\theta$ between the sensor axis and the magnetic north changes accordingly; i.e., the angle $\theta$ continually measures the heading angle $\gamma$. The output voltage from the magnetometer decreases in proportion to the cosine of the angle $\theta$ between the boat and the desired course, and the meter 35 indicates the magnitude of the angle $\theta$.

The component of the boat velocity in the direction of the desired course is measured by coupling the voltage signal 34 to a full-wave rectifier circuit 80. The rectifier circuit produces an output voltage signal 82 which is positive during each one-half cycle when the voltage 34 is a negative value, so that the voltage 82 is proportional to the cosine of the angle $\theta$, but of positive phase. The actual speed of the boat in the water is measured by conventional means, such as by a meter 83 which produces a voltage signal 84 having a magnitude B proportional to boat speed. Voltage signal 84 is coupled with voltage signal 82 to a multiplier circuit 86 which produces an output voltage signal 88 having a magnitude proportional to the product of the boat speed and the absolute value of the cosine of the angle $\theta$. Voltage signal 88, which has a magnitude $B|\cos\theta|$, is a measure of course-made-good speed $W = B \cos \gamma$ since the angle $\gamma$ equals the angle $\theta$. Voltage signal 88 is coupled to a course-made-good meter 90 which displays course-made-good speed. The heading meter 35 displays the angle $\gamma$.

In use, the apparatus shown in FIG. 3 provides a rapid determination of the course, or tack, to follow to reach a given mark in the shortest time. For example, if a mark to be reached is upwind from the boat in the direction of the true wind, the desired course, i.e., the direction of the true wind, is referenced by heading the boat in the direction of the true wind and then aligning the magnetometer sensor with the magnetic north. The direction of the true wind is easily sensed because the true wind and apparent wind vectors are parallel when the boat is headed into the wind. The magnetic north can be sensed by turning the knob 66 to move sensor 30 until the heading meter 35 reads 0°.

A more accurate way to align the sensor with the magnetic north is to first move it to a position at a right angle relative to the earth's magnetic field so the heading meter 35 reads either plus or minus 90°. The sensitivity of the cosine voltage signal 34 in the vicinity of plus or minus 90° is substantially greater than it is near 0°. This permits a substantially more accurate initial alignment of the magnetometer sensor. After the sensor is aligned at a right angle from the magnetic north, the position of the sensor is then turned 90°, using the compass rose card 64 as a guide. Thus, the sensor is accurately aligned with the magnetic north. The previously described friction device is then applied to lock the sensor in its reference position.

Thereafter, the boat is steered to determine the tack into the wind which produces a maximum reading on course-made-good meter 90. The reading on heading meter 35 indicates the heading of the boat relative to the direction of the true wind. When the time comes to change course, the boat is turned through an arc of substantially 90°, using the meter 35 as a guide, and the meter 90 is then monitored to determine the course which again produces the maximum velocity in the direction of the true wind. Tacking back and forth in this manner eventually permits the boat to reach the upwind mark in minimum time.

A similar procedure is followed to maximize course-made-good speed when sailing with the wind.

When sailing for a mark at a large angle from the wind, for example, the magnetometer sensor is aligned with the magnetic north when the boat is headed in the direction of the mark. Thereafter, the meter 35 measures the deviation of the boat from the desired right-angle course, and the meter 90 measures course-made-good velocity for determining whether a slightly different course will maximize the component of the boat's velocity in the direction of the mark.

As discussed above, the voltage signal 34 from the magnetometer is representative of the cosine of the angular deviation of the lubber line of the boat from the boat's desired direction. The cosine function is the inherent output of the magnetometer, and this feature is especially advantageous in the present system because it eliminates the need for a mechanism, such as an angle resolver, for deriving the cosine function. This permits the course-made-good speed measuring system of this invention to be implemented at a reasonable cost to most sailboat owners.

As previously explained, the combination of the magnetometer and the course deviation indicator 35 provides a steering compass for measuring the angular deviation of the boat from a desired heading. The axis of the magnetometer sensor is simply aligned with the magnetic north when the boat is parallel to the desired heading (i.e., the angle between the sensor axis and magnetic north is 0°). Thereafter, as the boat deviates from the desired heading, the magnetometer produces a voltage signal which is proportional to the cosine of the boat's angular deviation. As previously explained, the sensitivity of the cosine function is substantially greater in the vicinity of plus or minus 90° than it is near 0°. Thus, when the axis of the magnetometer sensor is aligned with magnetic north to initially reference the boat's desired heading, small angular deviations from the desired heading are difficult to observe because of the low sensitivity of the cosine function near 0°.

FIG. 7 shows a magnetometer steering compass which produces an accurate measurement of small angular deviations of the boat from a selected heading. In this system, when the boat is headed on its desired course the magnetometer sensor 30 is positioned at a 90° angle from magnetic north with the aid of the compass rose card 64, so that no output voltage signal is generated by the magnetometer circuitry 32 when the card is oriented toward magnetic north. In this case, the axis of the magnetometer sensor is pointing toward magnetic east. When the selected course is followed exactly, the voltage signal 34 from the magnetometer will be zero since the sensor axis is oriented 90° from magnetic north. Any angular deviation $\delta$ from the selected course will produce a magnetometer voltage signal 34 proportional to the sine of the angular deviation $\delta$. This voltage signal is transmitted to a course deviation indicator 92 which translates the signal into the angle of deviation $\delta$ from the selected course. The course deviation indicator contains a dial face marked off in degrees from $-90°$ to $0°$ to $+90°$. The dial scale is linear with the sine of the angular deviation $\delta$. This effectively amplifies small angular deviations and allows fine steering of the boat. A pointer 94 swings right or left of 0° to indicate the right or left deviation from the selected course.

In the magnetometer steering compass shown in FIG. 7 a cable (not shown) connects the course deviation indicator 92 to the flux gate circuitry. The steering compass may be built as a separate unit, with the flux gate circuitry mounted on a separate circuit board. The course-made-good speed measuring system, which includes rectifier 80, the boat speed measuring device, multiplier 86, and course-made-good indicator 90, may also be constructed as a separate unit and mounted on a separate circuit board. The steering compass may be used by itself to measure boat deviation from a selected course, or it may be coupled to the course-made-good speed measuring system by means of a cable (not shown) to separately measure boat deviation and course-made-good speed.

The course-made-good apparatus of this invention is particularly useful as a means for establishing a continuous record of the boat's performance. The apparatus is also useful in providing a comparative measurement of the performance of various riggings.

The present invention has been described in the context of the preferred means for carrying out the invention, and it is understood that various features of the preferred embodiment can be modified without departing from the scope of the invention. For example, a different type of magnetometer than the flux gate magnetometer can be used to sense the direction of the earth's magnetic field. Furthermore, other means can be used to sense the direction of a fixed reference point. For example, a compass can be used to sense magnetic north, and the compass card can be adapted to drive a cosine potentiometer to measure the deviation of the boat from the desired course. A gyroscope can be used to establish an inertial reference point. Moreover, the phase of the voltage signal 34 from the magnetometer circuitry is rectified to simplify converting the voltage to the scale reading on meter 90. However, other means can be used for converting the voltage to a scale reading of course-made-good speed.

We claim:

1. Course-made-good apparatus for detecting the heading of a sailboat that produces the maximum component of boat velocity in a desired direction, the apparatus comprising:
   a. means for sensing the direction of a reference point from a point on the boat so as to produce a continuous measurement representative of the angle between the reference point and a reference line on the boat;
   b. adjustable alignment means on the boat to cooperate with the sensing means to produce a reference measurement of the angle between the desired direction of the boat and the reference point;
   c. means responsive to the instantaneous magnitude of the reference measurement and the angle measured by the sensing means for producing a course deviation signal representative of the angular deviation of the reference line on the boat from the desired direction of the boat;
   d. means for producing a speed signal representative of the instantaneous speed of the boat; and
   e. means responsive to the course deviation signal and speed signal for producing a velocity vector signal representative of the vector component of boat speed in the desired direction.

2. Apparatus according to claim 1 including means responsive to the velocity vector signal for monitoring the vector component of the boat speed in the desired direction.

3. Apparatus according to claim 1 wherein the sensing means includes a magnetometer sensor for sensing the direction of the earth's magnetic field; and wherein the alignment means includes means for maintaining the axis of the sensor in a fixed position relative to the reference line on the boat, whereby the sensor may be initially aligned with the earth's magnetic field when the boat is headed on the desired course to produce the reference measurement.

4. Apparatus according to claim 3 wherein the means for producing the course deviation signal includes magnetometer circuit means coupled to the magnetometer sensor for producing a voltage proportional to the cosine of the angle between the axis of the sensor and the earth's magnetic field.

5. For use with a sailboat, course-made-good apparatus for detecting the heading of a sailboat that will produce the maximum component of boat velocity in a selected direction, the apparatus comprising:
   a. magnetometer means including a movable sensing element for detecting the direction of a magnetic reference point from a point on the boat;
   b. means for adjusting the position of the sensing element and setting the element at a fixed reference position relative to a reference line on the boat defining an initial angle between the magnetic reference point and the reference line on the boat when the boat is headed in the selected direction;
   c. means coupled to the sensing element and responsive to the setting of the initial angle for producing a heading signal representative of the cosine of the angular deviation of the sensing element from its reference position;
   d. means for producing a speed signal representative of boat speed; and
   e. means responsive to the heading signal and the speed signal for producing a velocity vector signal representative of the vector component of boat speed in the selected direction.

6. Apparatus according to claim 5 including means responsive to the velocity vector signal for monitoring the vector component of boat speed in the selected direction.

7. Apparatus according to claim 5 wherein the means for maintaining the sensing element in a fixed position includes a gimbal system fixed to the boat and having a stable gimbal element for mounting the magnetometer sensing element to stabilize the motion of the sensing element in the horizontal plane.

8. Apparatus according to claim 7 wherein the means for maintaining the sensing element in a fixed position further includes means for moving the sensing element relative to the boat, and releasable locking means for maintaining the sensing element in a fixed position relative to the boat.

9. Apparatus according to claim 8 wherein the means for producing the velocity vector signal includes multiplier means for producing an output signal representing the product of the magnitude of the boat speed and heading signals.

10. Apparatus according to claim 9 wherein the means for producing the velocity vector signal further includes rectifier means for producing a signal representing the absolute value of the magnitude of the heading signal.

11. Apparatus according to claim 10 including means responsive to the heading signal for monitoring the angular deviation of the boat from the desired direction.

12. A method of detecting the heading of a sailboat that produces the maximum component of boat velocity in a desired direction, the method comprising:
   a. sensing the direction of a fixed reference point from a point on the boat to continuously produce a sensed measurement representative of the angle between the fixed reference point and a reference line on the boat;
   b. producing a reference measurement of the angle between the desired direction of the boat and the fixed reference point;
   c. responding to the reference measurement and the sensed measurement to produce a course deviation signal representative of the angular deviation of the reference line on the boat from the desired direction of the boat;
   d. producing a speed signal representative of the instantaneous speed of the boat; and
   e. combining the course deviation signal and the speed signal to produce a velocity vector signal representative of the vector component of boat speed in the desired direction.

13. The method according to claim 12 including monitoring the velocity vector signal.

14. The method according to claim 16 in which (a) a sensing device senses the direction of the reference point and generates an output representative of the angle between the reference point and the reference line on the boat, (b) the reference measurement is produced by positioning the sensing device with respect to the fixed reference point so that it generates a given output when the boat is headed in the desired direction, and (c) the output of the sensing device varies as the reference line on the boat deviates from the desired direction of the boat, the output being representative of the angular deviation between the reference line and the desired direction.

15. The method according to claim 14 including multiplying the course deviation signal and speed signal to produce the velocity vector signal.

* * * * *

UNITED STATES PATENT OFFICE
CERTIFICATE OF CORRECTION

Patent No. No. 3,685,352      Dated August 22, 1972

Inventor(s) Edwin Pounder and John R. Casani

It is certified that error appears in the above-identified patent and that said Letters Patent are hereby corrected as shown below:

IN THE CLAIMS:

Column 10, line 61, after the word claim, change "16" to --12--

Signed and sealed this 9th day of January 1973.

(SEAL)
Attest:

EDWARD M. FLETCHER, JR.          ROBERT GOTTSCHALK
Attesting Officer                Commissioner of Patents